United States Patent [19]

Lawrence

[11] Patent Number: 4,782,623
[45] Date of Patent: Nov. 8, 1988

[54] METHOD AND APPARATUS FOR TERMITE CONTROL

[75] Inventor: Lucas G. Lawrence, San Bernardino, Calif.

[73] Assignee: Daniel J. Bondy, Las Vegas, Nev.

[21] Appl. No.: 149,120

[22] Filed: Jan. 27, 1988

[51] Int. Cl.[4] ............................................. A01M 3/00
[52] U.S. Cl. .................................................. 43/132.1
[58] Field of Search ................ 43/132.1; 307/108, 284

[56] References Cited

U.S. PATENT DOCUMENTS 3,745,377  7/1973  Johnson .............................. 307/284
4,223,468  9/1980  Lawrence ........................... 43/132.1
4,366,644  1/1983  Lawrence ........................... 43/132.1

Primary Examiner—M. Jordan
Attorney, Agent, or Firm—Christie, Parker & Hale

[57] ABSTRACT

An apparatus and method utilizing a phase-locked high voltage, high-frequency pulse generator capable of quasi-unlimited power output and an applicator gun for feeding electric power into pest-infested dielectrics, for example termite infested wood. Utilizing a conventional line frequency of 50 or 60 Hz, the generator produces high energy pulses. The pulses are fed into an applicator gun for application at high voltages. The voltages penetrate dielectrics and electrocute the pests inside.

15 Claims, 2 Drawing Sheets

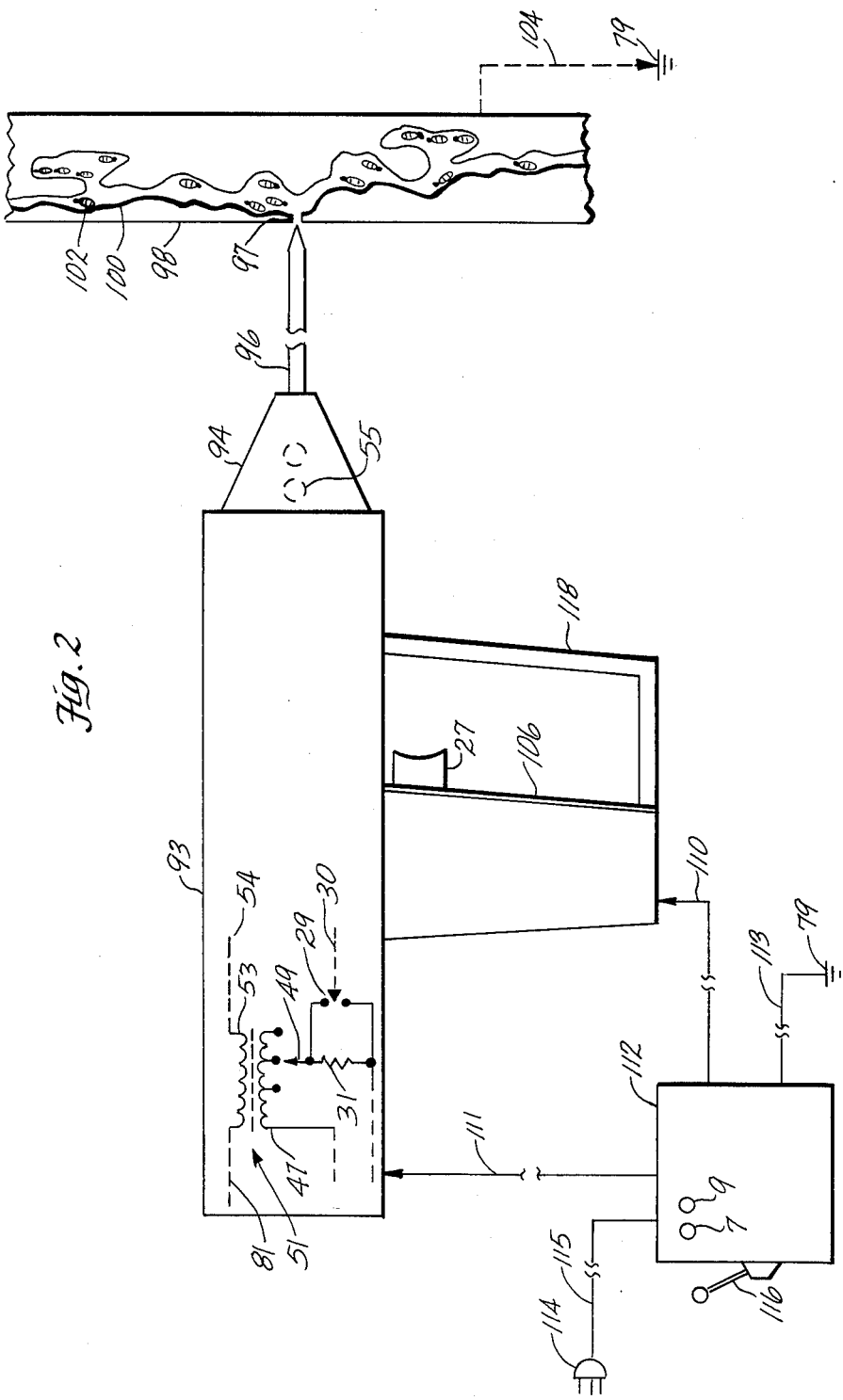

METHOD AND APPARATUS FOR TERMITE CONTROL

BACKGROUND OF THE INVENTION

This application pertains to a phase-locked pulse generator and electrical applicator gun for electrical termite control. It is an improvement on the method and apparatus disclosed in U.S. Pat. Nos. 4,223,468 and 4,366,644.

Previous systems of electric termite control, as described in U.S. Pat. Nos. 4,223,468 and 4,366,644, used vibrators and oscillators for high voltage, high-frequency generation. These devices have limited power output, are prone to breakdowns, and require periodic maintenance.

SUMMARY OF THE INVENTION

The present invention represents a significant improvement over the prior art designs. In contrast to the use of vibrators and oscillators in the earlier systems, power in the present invention is now generated by capacitive discharge. The discharging capacitor resonates with an inductor, giving a frequency product according to the convention $\frac{1}{2}$ LC, where L is the inductance and C is the capacity of the circuit elements and, the system power output is phase locked at a specific frequency. The power output, in wattage, is quasi-unlimited. The only restrictions are the quality and size of components used.

Preferably, the operating frequency is chosen to be 67 kHz. Output energy at this frequency does not pose dangers to the human operator of this system, but it is still low enough to penetrate wood and electrocute any termites inside.

The invention uses a probe gun with an elongated external application electrode extending from one end. The electrode is designed to deliver the energy to an infested structure. To protect the human operator from accidental contact with the external application electrode, and to safeguard him or her against high voltage backflash, a special guard mechanism has been incorporated into the trigger of the probe gun. The trigger is a two-stage power switch. In the first stage, the apparatus is turned on by a power relay; in the second stage, the switch shunts a resistor that is in series with the primary winding of the gun transformer. Thus, the apparatus starts at low power but when the trigger is squeezed harder, the apparatus switches to a high-power mode.

Materials can be treated in either mode. Breaking down the dielectric properties of wood, for example, requires a high-power mode; whereas the treatment of voltage-sensitive museum items (insect-infested paintings, paper, etc.) requires a lower power level to avoid damaging the item being treated.

The quasi-unlimited power output of this apparatus is useful in large-scale applications. For example, trees and wooden bridges infested by termites, beetles, and carpenter ants. In large-scale applications, the applicator gun can be handled by hoists and operated by remote control.

BRIEF DESCRIPTION OF THE DRAWINGS

The invention will be further understood by reference to the attached drawings which depict the operating principles and advantages of the invention.

FIG. 2 is a drawing of the applicator gun and its feeder equipment.

DESCRIPTION OF A SPECIFIC EMBODIMENT

Figure 1:
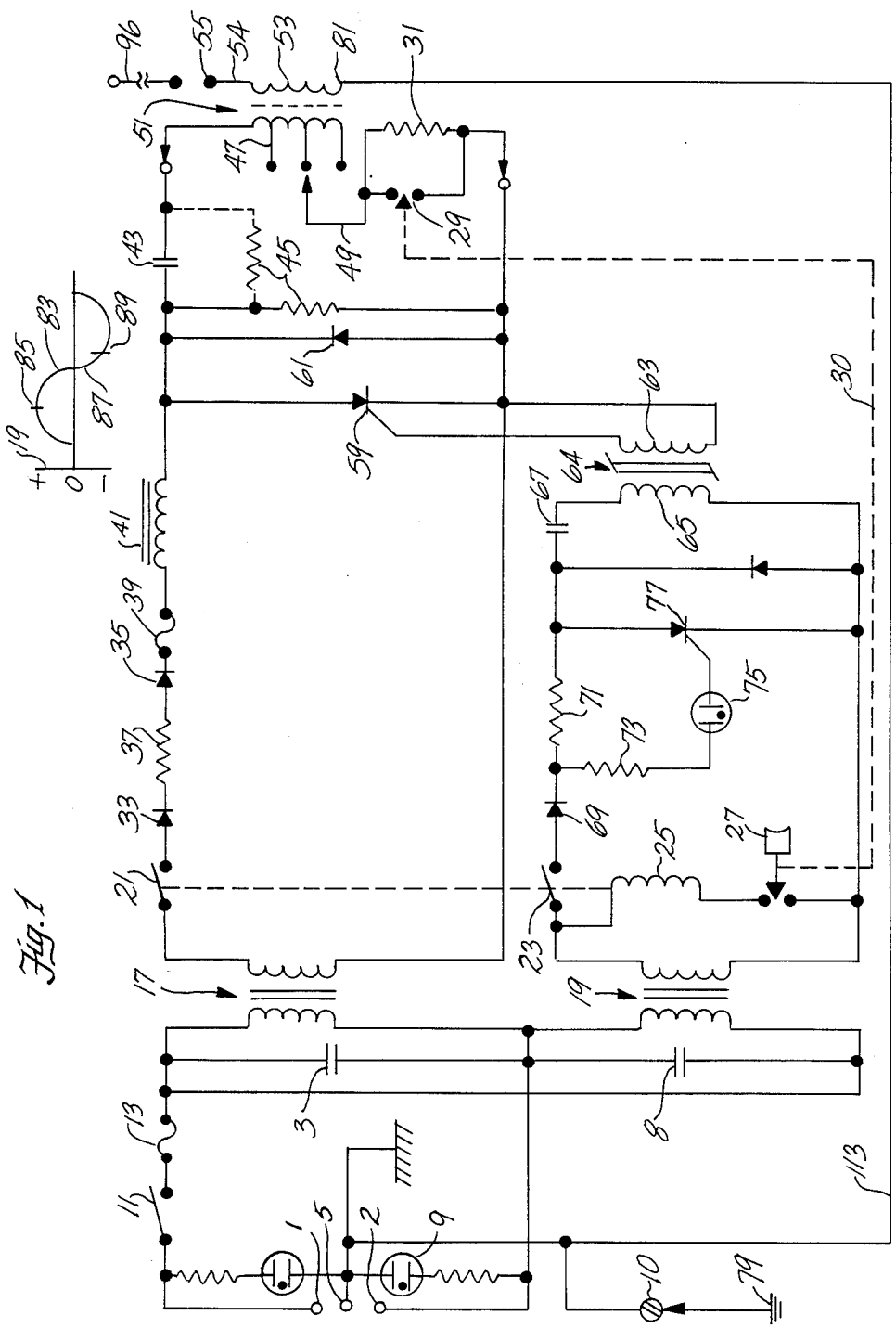
FIG. 1 is a schematic diagram of the phase-locked power generator according to the present invention and its internal electronics.

Referring to FIG. 1, the main power output section of the invention is based on a capacitor 43. The capacitor 43 is rapidly charged and discharged by a shunting thyristor switch 59, causing oscillations in a series-connected inductor 47. The inductor 47 is tapped at 49 and a specific frequency output is generated. The transformed output 51 is sent to a gun electrode 96.

Referring now to FIG. 2, the gun structure features a handle 106 and an activation switch 27. Arranged in front of the handle 106 is a bracket 118, which safeguards the operator's hand against high voltage backflash from the gun electrode 96. The main power capacitor is part of a circuit including a resistance 45 and an inductance 47 which oscillates at a specific frequency. Inductor 47 is also connected in series with a resistance 31, allowing the power level of the oscillation to be varied at will. A diode 61 ensures continuity of the inductive current, forming a complete high-frequency sine wave. Inductance 47 is the primary winding of a high voltage transformer 51 contained in the applicator gun 93.

The capacitive discharge circuit operates in a phase-locked mode. A half-wave rectified sine wave 83 charges a direct current [DC] storage capacitor 43 to full peak voltage 85. Full electrical charge of the capacitor 43 is at the 90-degree point 85 of the sine wave. The sine wave 83 then cycles from its positive peak 19 toward zero, as the storage capacitor 43 waits to be discharged by a thyristor switch 59. The peak DC voltage of the capacitor 43 is root mean square voltage [rms]×1.41. The main power thyristor 59 now awaits its power-release signal from the trigger transformer 64, which is the output stage of the phase-locked trigger generator energized by line transformer 19. The electric power stored in capacitor 43 is then transformed by a transformer 51 and fed into the gun electrodes 96 depicted in FIG. 2.

Because the charging and discharging cycles as seen by the main power capacitor 43 are interlocked, the system is highly efficient. The capacitor 43 can never be discharged into its associated inductor 47 while charging is incomplete; in addition, the heavy electrical stress on the components caused by incomplete purging of the main power capacitor 43 is eliminated.

Typical component values are 435 millihenries for the suppressor choke 41; 1.5 microfarad and 2,000 volts for the main power capacitor 43; and 3.7 microhenries for the inductance 47 comprising the primary winding of the high voltage output transformer 51. The phase-locked pulse train oscillates at 67 kHz for a duration of 80 microseconds, with pulse bursts spaced at 16.2 milliseconds apart. The technique of spaced pulsing, rather than continuous application of radio-frequency energy, is efficient in penetrating complex dielectrics, such as wood, without raising the temperature of the wood or other target substances to incendiary levels. The power consumption of the phase-locked generator is 0.1 ampere at 460 volts, or 46 watts. During the pulse-burst generation, the main power capacitor 43 operates at 649 volts dc peak, 65 amperes. The instantaneous burst energy for one cycle is 42.3 kilowatts. This power product is fed by cables into the applicator gun shown in FIG. 2.

The function of each of the parts of this preferred embodiment is best understood by beginning with FIG. 2. The applicator gun is comprised of a plastic housing 93 for the electrical elements, a high voltage transformer 51 with its primary 47 and secondary 53 windings. A spark gap 55 in the front section of the gun 94 acts as an impedance safeguard. The electrical treatment power is conveyed by an electrode 96 to a termite-infested target 102 such as wood 98. When energized, the electrode 96 feeds electrocuting energy into the kickout holes 97 made by the termites which reside in galleries 100. The electrode may be applied to any section of the wood 98 the gun operator elects because the applied high voltage, high-frequency energy is conducted through the wood 98, and the galleries 100, to the termites 102. The electrical energy generated seeks a path of highest conduction as it seeks a ground return 104, 79. Because the moist, carbon-rich bodies of the insects provide the highest conductance, they experience the highest current density, resulting in immediate electrocution.

In a typical application, the gun operator sweeps the gun back and forth over a termite-infested structure. The electrical energy now radiates into the structure because of its high voltage and high frequency. The gun may be operated in two different power modes to accommodate the different dielectric properties of target materials.

Electrical power to the gun is provided by two energy cables and one grounding cable 111. There are two separate energy cables 110 for the triggering relay circuit 25 (depicted in FIG. 1). The energy and grounding cables are all connected to power unit 112. Power unit 112 is in turn connected to a conventional power line by a three prong plug 114 and line 115, and activated by a conventional switch 116. Two neon lamps 7,9, serve as ground monitors to confirm that a true earth ground 79 is present and that the grounding cables 113 are in place.

The power output of the gun is controlled by a two-stage function switch 27. The switch initially energizes the gun and, when depressed further, activates a mechanical linkage 30 which closes a switch 29 and shunts a coil resistor 31, effecting a higher power output. The primary side of the gun coil is tapped at 49 to permit changes of operating frequency. The high voltage secondary coil 53 of the gun transformer is connected at 54 to the spark gaps 55 in the output section 94. The other end is connected to the ground side 81. In a typical application, about 20 feet of cables connect gun 93 to its power generator 112.

The function of the other system parts is best understood by referring again to FIG. 1.

Before using the apparatus, the operator checks that the power unit 112 is properly grounded by checking the two neon lamps 7, 9, which are connected across the power input terminals 1, 2 and the ground terminal 5. The unit's chassis 6 is also connected to the ground terminal. If the apparatus is properly grounded, only one of the two neon lamps 7, 9 will light up brightly. The other lamp will be at ground potential so it will not light up.

Next, the generator is turned on by a switch 11. This step energizes the power transformer 17 of the main power generator and the power transformer of the smaller trigger generator 19, which are protected by a fuse 13. When the grun trigger switch 27 is squeezed, a relay 25 is energized and energy conveyed through two sets of contacts 21, 23, to the circuitry of the apparatus.

With the relay 25 energized in the main power section, current flows through contacts 21, through a rectifier diode 33, through an isolation resistor 37, through another rectifier diode 35, a fuse 39 and a radio frequency (r.f.) choke 41, into the main power capacitor 43, charging the capacitor to its design potential. The r.f. choke prevents high energy oscillations from destroying the power supply.

The trigger generator is activated when the relay contacts 23 are closed. The phase-reversed alternating current is half-wave rectified by a diode 69, passed through a resistor 71, and charges a capacitor 67 that is connected in series with the primary winding of the trigger transformer 65. The ionization level of a neon lamp 75, connected in series with a matching resistor 73, determines when the capacitor discharges. The incoming, half-wave rectified sine wave increases in voltage as it charges the capacitor. The lamp fires when the sine wave voltage reaches the lamp's ionization voltage. This happens only when the negative excursion 87 of the common sine wave has reached −80 electrical degrees 89, typically 65 volts. The lamp triggers the thyristor 77 into the ON mode. The thyristor 77 discharges storage capacitor 67, providing a sharp pulse spike about 10 microseconds long. This pulse is impedance-transformed by a pulse transformer 64, whose secondary winding 63 feeds the pulse to the gate of the main power thyristor 59. The thyristor 59 discharges the main power capacitor 43, creating powerful oscillations in the gun transformer. A diode 61 ensures continuity of the inductive current, and safeguards the thyristor against transient spikes. A resistor 45 is connected in parallel to the high voltage circuit to rapidly dissipate dangerous direct current potentials when the generator is turned off. Two capacitors 3 and 8 prevent r.f. frequency from flowing into domestic power lines. A separate terminal 10 provides connection for an auxiliary ground 79.

The present invention for electric insect control is of a non-poisonous type and transcends the risks associated with chemical pest control. Like prior electric designs, it is also much more reliable, efficient and compact than chemical designs.

While this disclosure describes a specific embodiment of the invention, the inventor in describing only one embodiment intends in no way to abandon other embodiments which are within the spirit and scope of the present invention.

What is claimed is:

1. A high voltage pulse generator for pest destruction comprising,
    a source of electrical energy,
    a pulse generator for producing a plurality of high voltage electrical pulses at a fixed frequency from the electrical energy supplied by the energy source, and
    an applicator for applying the energy pulses to a pest infested target.

2. The high voltage pulse generator of claim 1 also comprising,
    means for selecting the voltage of the electrical energy supplied by the energy source from a plurality of different voltages thereby enabling the pulse generator to generate pulses at a plurality of different voltages.

3. The high voltage pulse generator of claim 1 in which the fixed frequency of the electric pulses is selectable from a plurality of different fixed frequencies.

4. The high voltage pulse generator of claim 1 in which the pulse generator comprises an oscillating single frequency capacitive discharge circuit.

5. The high voltage pulse generator of claim 4 in which the electrical energy supplied to the pulse generator is of alternating current.

6. The high voltage pulse generator of claim 5 in which discharge from the capacitive circuit is triggered by a thyristor trigger circuit, the thyristor trigger circuit being activated by the current amplitude of the voltage supplied to the pulse generator.

7. The high voltage pulse generator of claim 1 in which the energy source also comprises a conventional power line and at least one transformer for converting conventional alternating current line voltage to a higher voltage.

8. The high voltage pulse generator of claim 7 in which the energy source also includes means for monitoring whether the transformers are grounded.

9. The high voltage pulse generator of claim 1 in which the applicator includes at least one conducting electrode for conducting the pulses towards the target.

10. The high voltage pulse generator of claim 1 in which the applicator includes a switch for selecting from among a plurality of different signal pulse voltages.

11. The high voltage pulse generator of claim 9 in which the applicator is in the form of a hand-held gun, the gun having a handle, a switch for controlling the gun's output in the handle, and at least one electrode for conducting the pulses towards the target.

12. The high voltage pulse generator of claim 1 in which the pests are termites.

13. The high volage pulse generator of claim 1 in which the pest infected target is termite infested wood.

14. A method for destroying pests comprising,
    generating high voltage electric pulses at a fixed frequency,
    applying the pulses to a pest infected target.

15. The method of claim 14 in which the pest infected target is termite infested wood.

* * * * *